US012724502B1

(12) United States Patent
Liu et al.

(10) Patent No.: US 12,724,502 B1
(45) Date of Patent: Sep. 1, 2026

(54) MOUSE SCROLL WHEEL MECHANISM

(71) Applicant: TOPRAY MEMS INC., Hsinchu City (TW)

(72) Inventors: Chin-Sung Liu, Hsinchu City (TW); Chi-Ling Chang, Hsinchu City (TW); Hsiao-Ming Chien, Hsinchu City (TW)

(73) Assignee: TOPRAY MEMS INC., Hsinchu City (TW)

( * ) Notice: Subject to any disclaimer, the term of this patent is extended or adjusted under 35 U.S.C. 154(b) by 0 days.

(21) Appl. No.: 19/319,739

(22) Filed: Sep. 5, 2025

(30) Foreign Application Priority Data

Jul. 11, 2025 (TW) ................................ 114126470

(51) Int. Cl.
*G06F 3/0362* (2013.01)
*H01H 19/20* (2006.01)

(52) U.S. Cl.
CPC .......... *G06F 3/0362* (2013.01); *H01H 19/20* (2013.01)

(58) Field of Classification Search
None
See application file for complete search history.

(56) References Cited

U.S. PATENT DOCUMENTS

2010/0164908 A1* 7/2010 Hill ...................... G06F 3/0362 345/184

* cited by examiner

*Primary Examiner* — Nicholas J Lee

(57) ABSTRACT

A mouse scroll wheel mechanism includes a scroll wheel base, a vertically rotatable scroll wheel body, and a fixed base. The scroll wheel body is mounted on the scroll wheel base and defines a central accommodation space. A plurality of radially arranged guide grooves are formed in the scroll wheel body, each guide groove including at least one magnetic conductive member movable toward or away from the center of the scroll wheel body. The fixed base is secured to the scroll wheel base and positioned within the accommodation space. The fixed base includes at least one magnet disposed in a non-contact manner facing the guide grooves. As the scroll wheel body rotates, changes in rotational speed cause variations in magnetic force between the magnet and the magnetic conductive members, producing either an intermittent detent sensation or a free-spinning flywheel sensation for the user.

8 Claims, 10 Drawing Sheets

MOUSE SCROLL WHEEL MECHANISM

CROSS-REFERENCE TO RELATED APPLICATION

This application claims the priority of Taiwanese patent application No. 114126470, filed on Jul. 11, 2025, which is incorporated herewith by reference.

BACKGROUND OF THE INVENTION

1. Field of the Invention

The present invention relates generally to a technical field of mouse, and more particularly, to a mouse scroll wheel mechanism.

2. The Prior Arts

A mouse is used to control the cursor on the screen and perform corresponding operations in conjunction with a computer. In addition to the basic left and right buttons for input, some mice also have a scroll wheel for auxiliary control. Turning the scroll wheel allows for quick browsing of web pages or as an auxiliary cursor operation. To increase the accuracy of the scroll wheel rotation, these mice often have a mechanical spring inside that creates resistance to the scroll wheel, creating an intermittent, strong and weak gear sensation or feel as the scroll wheel rotates. This is known as the toggle mode. In addition, some users who want to browse web pages quickly may use a release mechanism inside their mouse. When released, the scroll wheel can be quickly rotated, for example, through a large angle or more than one full rotation at a time. This is known as the flywheel mode.

To allow users to easily switch between toggle mode and flywheel mode, some mice have an electronic control component and a mechanical linkage structure installed inside the mouse to drive the mechanical spring out of its original locking position, thereby achieving the purpose of switching between different operating modes. Therefore, during operation, the finger must first move to the trigger button and, after triggering, return to the scroll wheel to continue in a different operating mode. This method is inconvenient for the operator.

Therefore, some manufacturers have designed a smart mouse that uses an internal electronic control circuit to directly drive a release mechanism when detecting rapid rotation of the scroll wheel, switching from toggle mode to flywheel mode. During this process, if the scroll wheel speed drops to a set value, the internal electronic control circuit returns to the original toggle mode. However, this type of smart mouse still requires an internal electronic control circuit and a switching mechanism, which is expensive. In addition, the switching process still requires a short period of time for the electronic circuit to drive the release mechanism, which can cause the scroll wheel to stagnate and become unsmooth. Therefore, the present invention seeks a solution to this problem.

SUMMARY OF THE INVENTION

A primary objective of the present invention is to provide a mouse scroll wheel mechanism, particularly one that utilizes centrifugal force to change the distance between components as the rotational speed of the scroll wheel body changes, generating variations in the strength of the magnetic force, thereby achieving the purpose of switching between a toggle mode and a flywheel mode. This structure does not require an additional electrical control circuit, thus providing a mouse structure that automatically switches the operation by rotating the scroll wheel body and at the lowest cost possible.

To achieve the aforementioned objective, the present invention employs the following technical solutions:

The present invention provides a mouse scroll wheel mechanism, comprising: a scroll wheel base, a scroll wheel body, and a fixed base; wherein the scroll wheel body is mounted on the scroll wheel base and rotates upright vertically, the scroll wheel body is partially annular and has a central accommodation space, the scroll wheel body has a plurality of radially distributed guide grooves, with each guide groove provided with at least one magnetic conductive member, and the magnetic conductive member moves within the guide groove in a direction toward or away from the center of the scroll wheel body; accommodation space the fixed base is fixed to the scroll wheel base and is located within the accommodation space, the fixed base is provided with at least one magnet, and the magnet is disposed in a non-contacting manner facing the guide groove, thereby when moving the scroll wheel body, the strength of the magnetic force exerted by the magnet on the magnetic conductive member changes as the rotation speed increases or decreases, thereby producing an intermittent gear feel or a rapidly rotating flywheel feel.

As one of the preferred embodiments, a plurality of the guide grooves are arranged at equal intervals on the scroll wheel body, and the guide grooves are distributed radially along the scroll wheel body.

As one of the preferred embodiments, the guide groove has an opening toward the center of the scroll wheel body. The magnetic conductive member can partially protrude through the opening without leaving the guide groove while located within the guide groove and moving inside the guide groove.

As one of the preferred embodiments, the guide groove has a radial width and an axial width, the magnetic conductive member has a magnetic conductive member diameter and an axial width, the opening has an opening radial width, the guide groove axial width is greater than the magnetic conductive member axial width, and the magnetic conductive member diameter is smaller than the guide groove radial width and greater than the opening radial width.

As one of the preferred embodiments, the magnetic conductive member is made of a metal or magnetic conductive material that can be attracted by a magnet and shaped as cylindrical, strip-shaped, spherical, or tubular.

As one of the preferred embodiments, the fixed base fixes a plurality of magnets at intervals and faces the guide groove, and the spacing between the plurality of magnets and the edge of the guide groove is the same.

As one of the preferred embodiments, the fixed base is arc-shaped and fixes the plurality of magnets.

As one of the preferred embodiments, a first angle is formed between two adjacent guide grooves, and the fixed base fixes a plurality of magnets at equal intervals and faces the guide groove, and two adjacent magnets form a second angle, and the first angle is equal to the second angle.

As one of the preferred embodiments, when the magnetic conductive member moves within the guide groove to a position closest to the center of the scroll wheel body, the magnet is closest to the magnetic conductive member and generates the strongest magnetic force; when the operator moves the scroll wheel body, the intermittent strong and weak magnetic force makes the operator feel a gear sensation.

As one of the preferred embodiments, when the magnetic member moves within the guide groove to the position furthest from the center of the scroll wheel body, there is no magnetic interaction between the magnet and the magnetic conductive member, and the operator can experience a flywheel feel when the scroll wheel body rotates rapidly.

Compared to the prior art, the mouse scroll wheel mechanism of the present invention utilizes the magnet to generate magnetic force on a part of equally spaced magnetic conductive members when the scroll wheel body rotates at a low speed, allowing the operator to experience an intermittent gear feel in the toggle mode. As the operator rapidly toggles the scroll wheel body to enter the flywheel mode, centrifugal force causes the magnetic conductive member to move within the guide groove and away from the magnet. There is no magnetic interaction between the magnet and the magnetic conductive member, and the scroll wheel body can rapidly rotate and enter the flywheel mode. This makes mouse operation easier and faster. Compared to conventional mice that require an electronic control circuit and a release mechanism, the present invention has a lower structural cost and is more competitive in the market.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

The following explains the terms used in the present document: "Gear feel/sensation" refers to the intermittent, tightening, and loosening sensation felt by the user when rotating the mouse wheel. "Flywheel feel/sensation" refers to the feeling of the mouse wheel rotating without resistance due to its own inertia, giving the user the sensation of rapid rotation.

Figure 1:
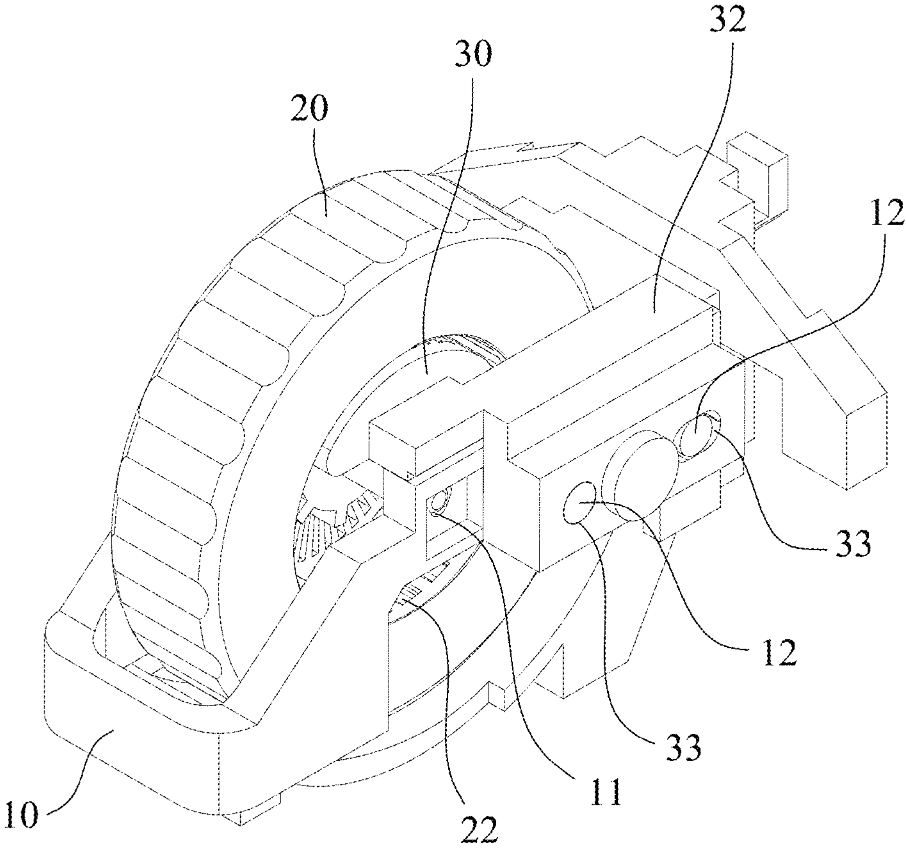
FIG. 1 is a perspective view of the present invention.
Figure 2:
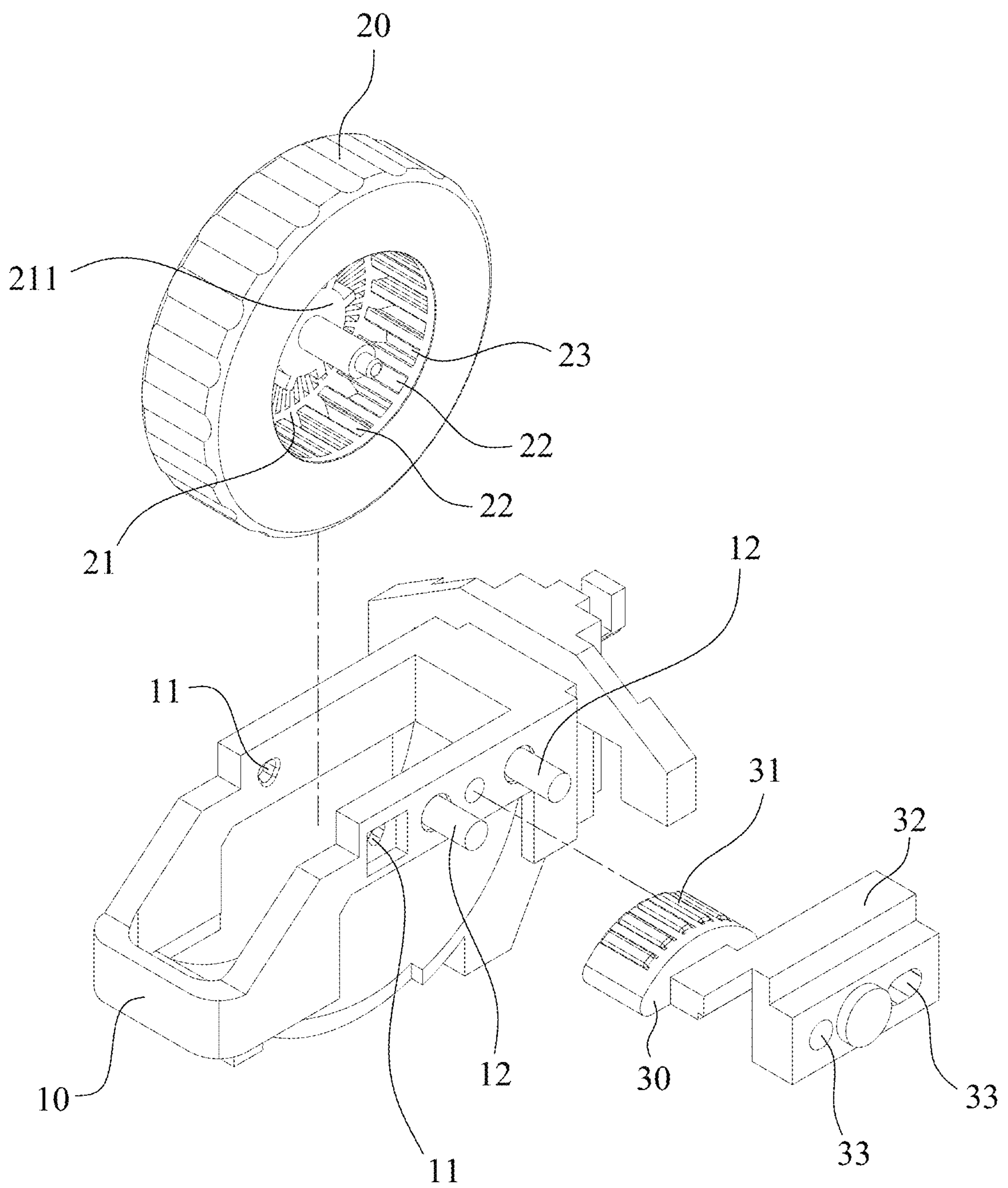
FIG. 2 is an exploded view of the present invention.

FIGS. 1 and 2 show a perspective view and an exploded view of the mouse scroll wheel mechanism of the present invention. The present invention provides a mouse scroll wheel mechanism, comprising: a scroll wheel base 10, a scroll wheel body 20, and a fixed base 30. The scroll wheel body 20 is disposed on the scroll wheel base 10 and can rotate vertically in an upright position. The scroll wheel body 20 has a central accommodation space 21. The scroll wheel body 20 has a plurality of radially distributed guide grooves 22. Each guide groove 22 is provided with at least one magnetic conductive member 23. The magnetic conductive member 23 moves within the guide groove 22 in a direction toward or away from the center of the scroll wheel body 20. accommodation space The fixed base 30 is fixed to the scroll wheel base 10 and is located within the accommodation space. The fixed base 30 is provided with at least one magnet 31, and the magnet 31 is oriented toward the guide groove 22 in a non-contact manner. When the magnetic conductive member 23 is located closest to the center of the scroll wheel body 20 within the guide groove 22, the distance between the magnetic conductive member 23 and the magnet 31 is the shortest, and the magnetic force is the strongest. Conversely, when the magnetic conductive member 23 is located farthest from the center of the scroll wheel body 20 within the guide groove 22, the distance between the magnetic conductive member 23 and the magnet 31 is the greatest, and the magnetic force is zero, indicating a released state. By moving the scroll wheel body 20, the centrifugal force adjusts the distance between the magnetic conductive member 23 and the magnet 31 as the speed of the scroll wheel body 20 increases or decreases, thereby varying the magnetic force exerted by the magnet 31 on the magnetic conductive member 23. This allows the operator to easily switch between toggle mode and freewheel mode. In toggle mode, the operator experiences a intermittent gear sensation, while in freewheel mode, the operator experiences a flywheel rotation of one or more revolutions. Next, a detailed description of the structure of each component is provided:

As shown in FIG. 2, the scroll wheel base 10 is used to support the scroll wheel body 20 and the fixed base 30. The scroll wheel body 20 is pivotally connected to the scroll wheel base 10, seemingly suspended in mid-air, allowing it to rotate freely in an upright position. The fixed base 30 secures the scroll wheel base 10 within the accommodation space 21, with the surface with the magnet 31 facing the guide groove 22. The magnet 31 can be disposed on the fixed base 30 at any angle. By the magnetic force, the magnetic conductive member 23 near the magnet 31 stops at the opening 221 of the guide groove 22. The scroll wheel base 10 must be compatible with the internal support structure of the mouse. Therefore, the scroll wheel base 10 can be adjusted to various shapes as needed to accommodate the corresponding support structure and is not limited to the shape shown in the figure. In the present embodiment, the scroll wheel base 10 is a rectangular frame with a horizontally extending axis hole 11. The axis hole 11 can be installed with a bearing to pivot the scroll wheel body 20 therein. A plurality of protruding support posts 12 is also provided on one side of the scroll wheel base 10, which serves as mounting posts for the fixed base 30.

Figure 3:
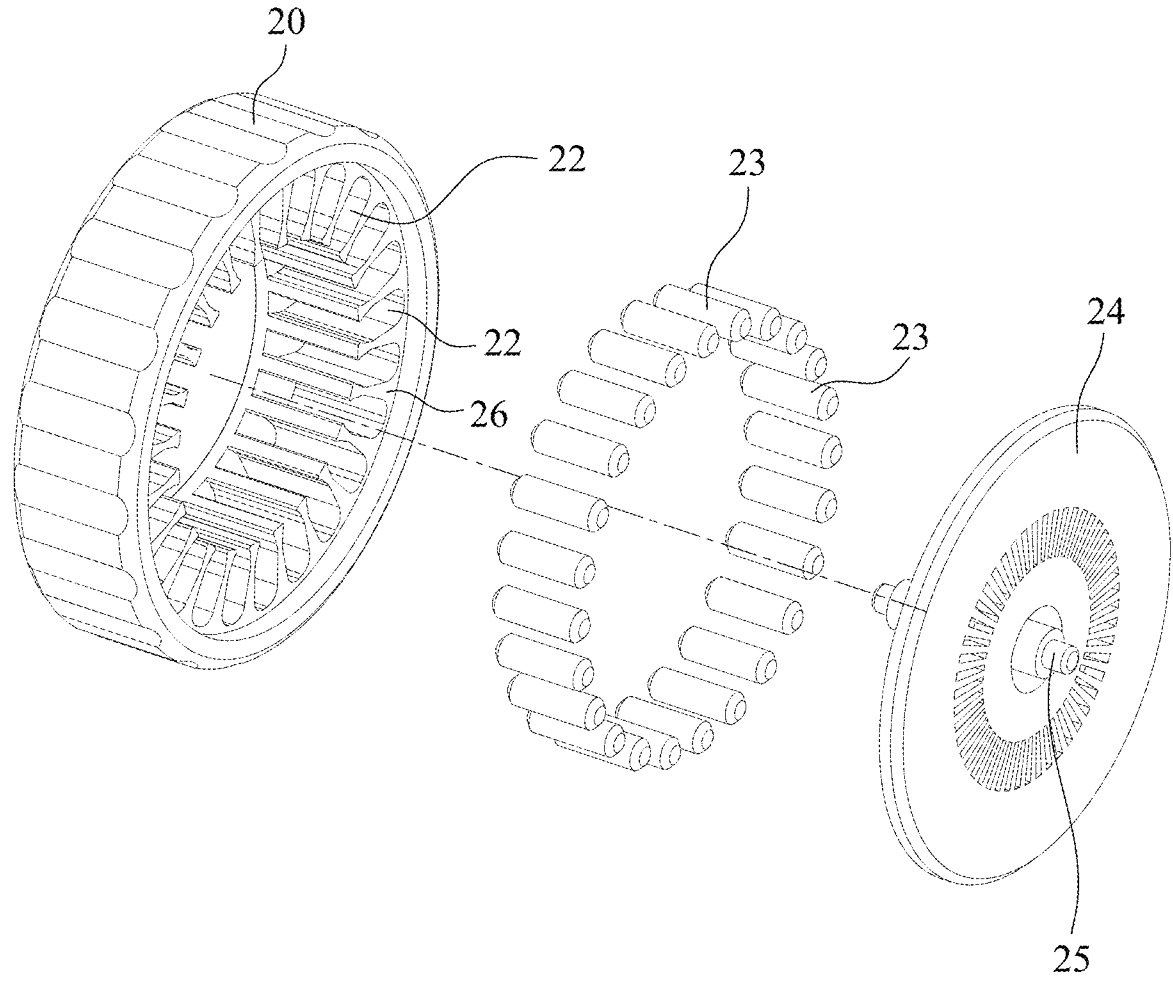
FIG. 3 is an exploded view of the scroll wheel body of the present invention.

As shown in FIGS. 2 and 3, the scroll wheel body 20 is partially annular and has an open central accommodation space 21. In the present embodiment, the region above the center of the scroll wheel body 20 within the accommodation space 21 is defined as an upper half region 211. The scroll wheel body 20 is provided with a plurality of radially distributed guide grooves 22. In the present embodiment, a grating disk 24 is incorporated into one side of the scroll wheel body 20. The grating disk 24 has a plurality of holes, which is a common structure used in mice. The grating disk, in conjunction with other electronic control components, accurately calculates the rotation angle of the scroll wheel body 20 for mouse control. In the present embodiment, a shaft 25 is located at the center of the grating disk 24, serving as the central axis of the scroll wheel body 20. During assembly, the scroll wheel body 20 is first positioned within the rectangular frame of the scroll wheel base 10. The shaft 25 extends through the shaft hole 11, allowing the scroll wheel body 20 to rotate freely and upright on the scroll wheel base 10.

A plurality of guide grooves 22 is disposed and evenly spaced within the scroll wheel body 20. To facilitate the installation of the magnetically conductive members 23 within the guide grooves 22, in the present embodiment, the scroll wheel body 20 has the guide groove 22 axially sealed on one side as shown in FIG. 2 and the other side of the scroll wheel body 20 has an unsealed mounting area 26 as shown in FIG. 3. The magnetically conductive members 23 are placed within the guide grooves 22 through the mounting area 26. During assembly, the grating disk 24 is also adhesively secured to the mounting area 26, thus sealing the guide grooves 22 on both axial sides of the scroll wheel body 20. The magnetically conductive members 23 are made of metal or magnetically conductive material that can be attracted by magnets and can be cylindrical, strip, spherical, or hollow in shape. In the present embodiment, the scroll wheel body 20 is made of a non-magnetic material, so adjacent magnetically conductive members 23 are separated by a non-magnetic material.

Figure 4:
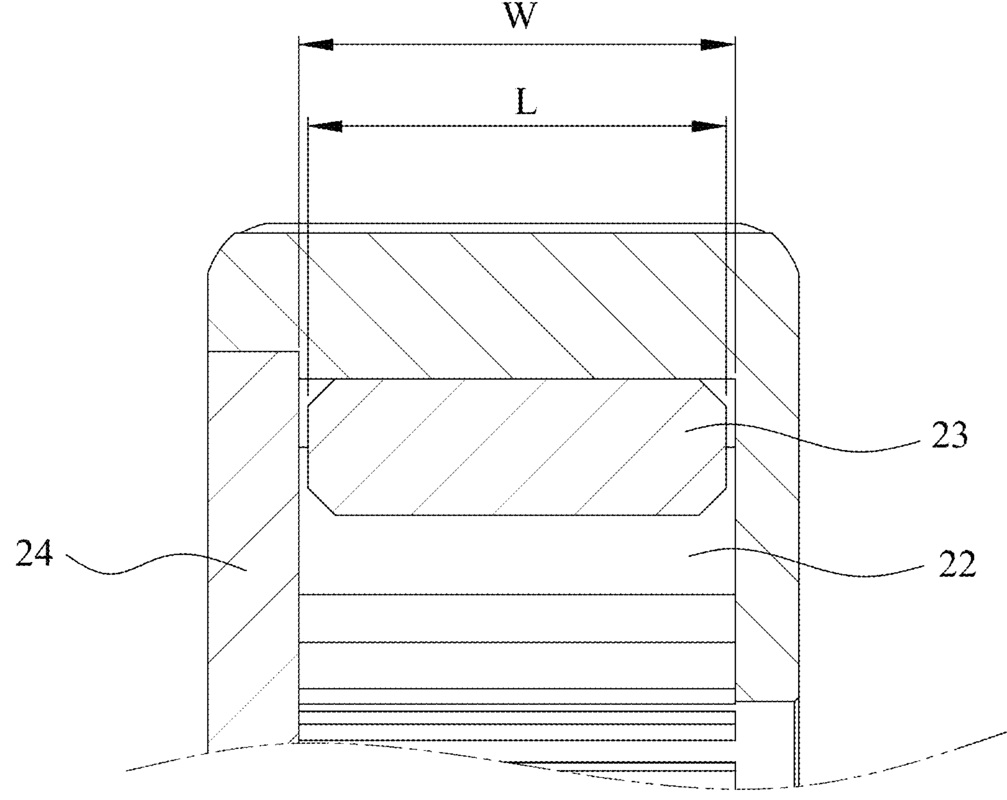
FIG. 4 is a partial cross-sectional view of the scroll wheel body of the present invention in the axial direction.
Figure 5:
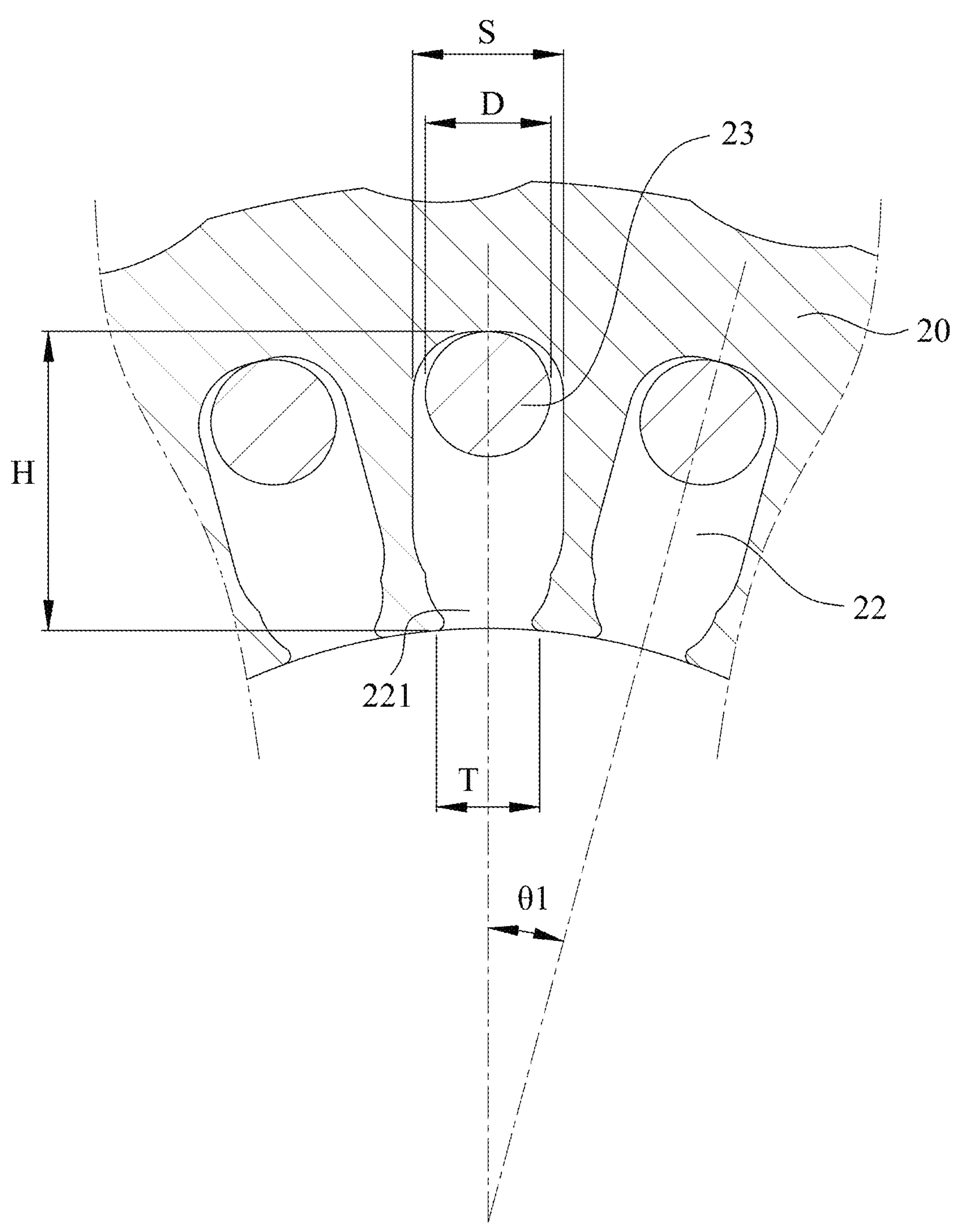
FIG. 5 is a partial cross-sectional view of the scroll wheel body of the present invention in the radial direction.

To enable the magnetic permeable member 23 to move within the guide groove 22, as shown in FIGS. 4 and 5, the guide groove 22 extends radially along the scroll wheel body 20. The guide groove 22 has a radial depth H, a radial width S, and an axial width W. The magnetic permeable member 23 has a diameter D and an axial width L, with the axial width W of the guide groove 22 being greater than the axial width L of the magnetic conductive member 23. The guide groove 22 has an opening 221 toward the center of the scroll wheel body 20. The opening 221 has a radial width T. The diameter D of the magnetic conductive member 23 is smaller than the radial width S of the guide groove 22 but greater than the radial width T of the opening 221. This allows the magnetic conductive member 23 to move radially within the guide groove 22, even partially protruding through the opening 221, without disengaging from the guide groove 22. The plurality of guide grooves 22 is evenly spaced within the scroll wheel body 20, such that the centerlines of adjacent guide grooves 22 form a first angle $\theta$1.

Figure 6:
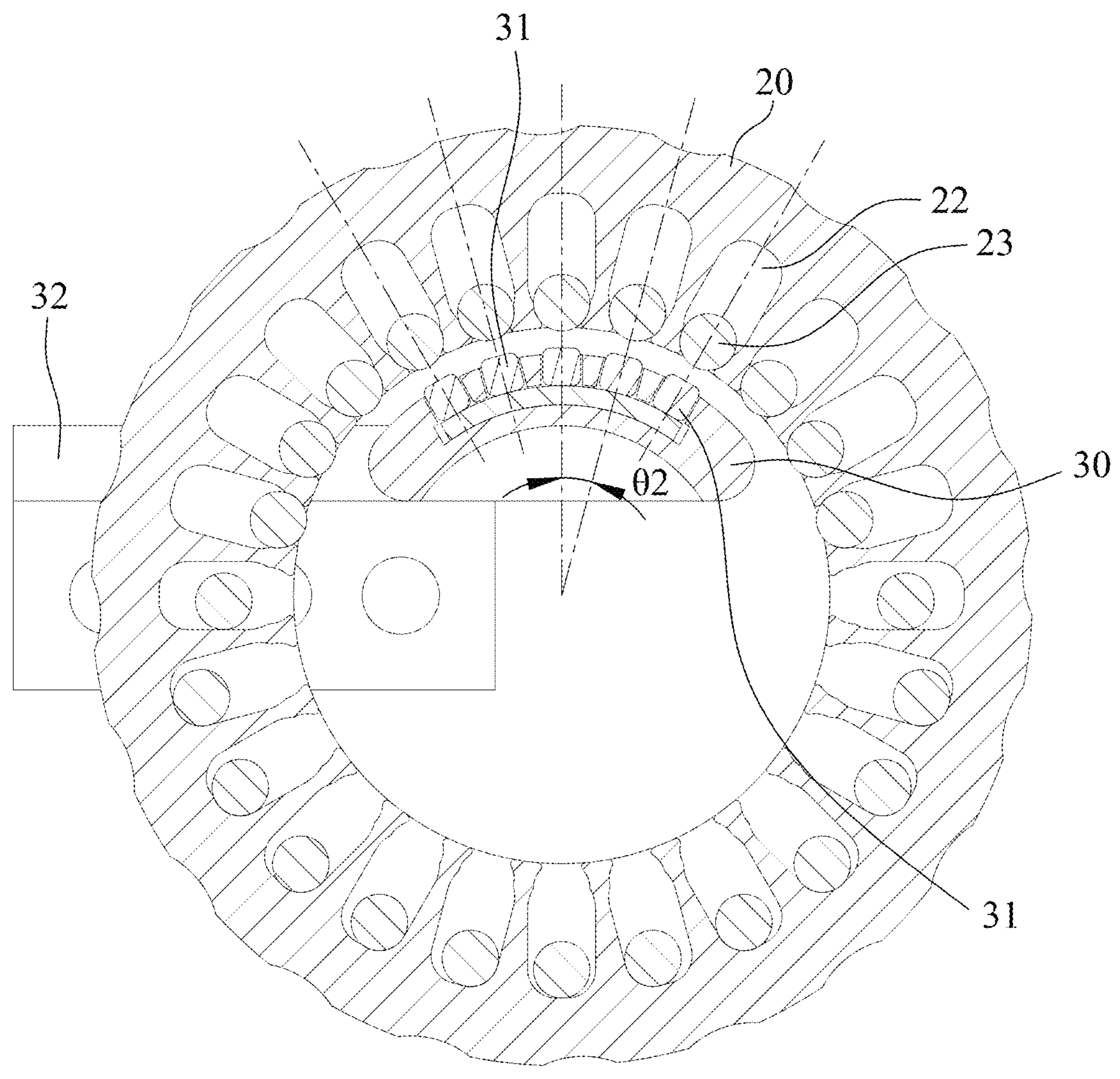
FIG. 6 is a schematic view of the relative positions of the scroll wheel body and the fixed base of the present invention.

As shown in FIGS. 2 and 6, the fixed base 30 primarily serves to secure the plurality of magnets 31 facing toward the guide groove 22, generating a magnetic force on the magnetically conductive member 23 within the guide groove 22. Therefore, in the present embodiment, the fixed base 30 has an arcuate shape, ensuring uniform spacing between the plurality of magnets 31 and the corresponding edges of the guide groove 22. Furthermore, the centerlines of two adjacent magnets 31 define a second angle $\theta$2. In the present embodiment, the first angle $\theta$1 is equal to the second angle $\theta$2. In the present embodiment, the first angle $\theta$1 and the second angle $\theta$2 are both 15 degrees, but are not limited thereto. To facilitate the attachment of the fixed base 30 to the scroll wheel base 10, in the present embodiment, the fixed base 30 is connected to a support member 32. The support member 32 has a plurality of assembly holes 33. During assembly, the support posts 12 are inserted into the assembly holes 33 and secured with adhesive or screws. This secures the fixed base 30 to the scroll wheel base 10 and positions it within the upper half region 211 (as shown in FIG. 1), positioning the plurality of magnets 31 within the upper half region 211 of the accommodation space 21.

Figure 7:
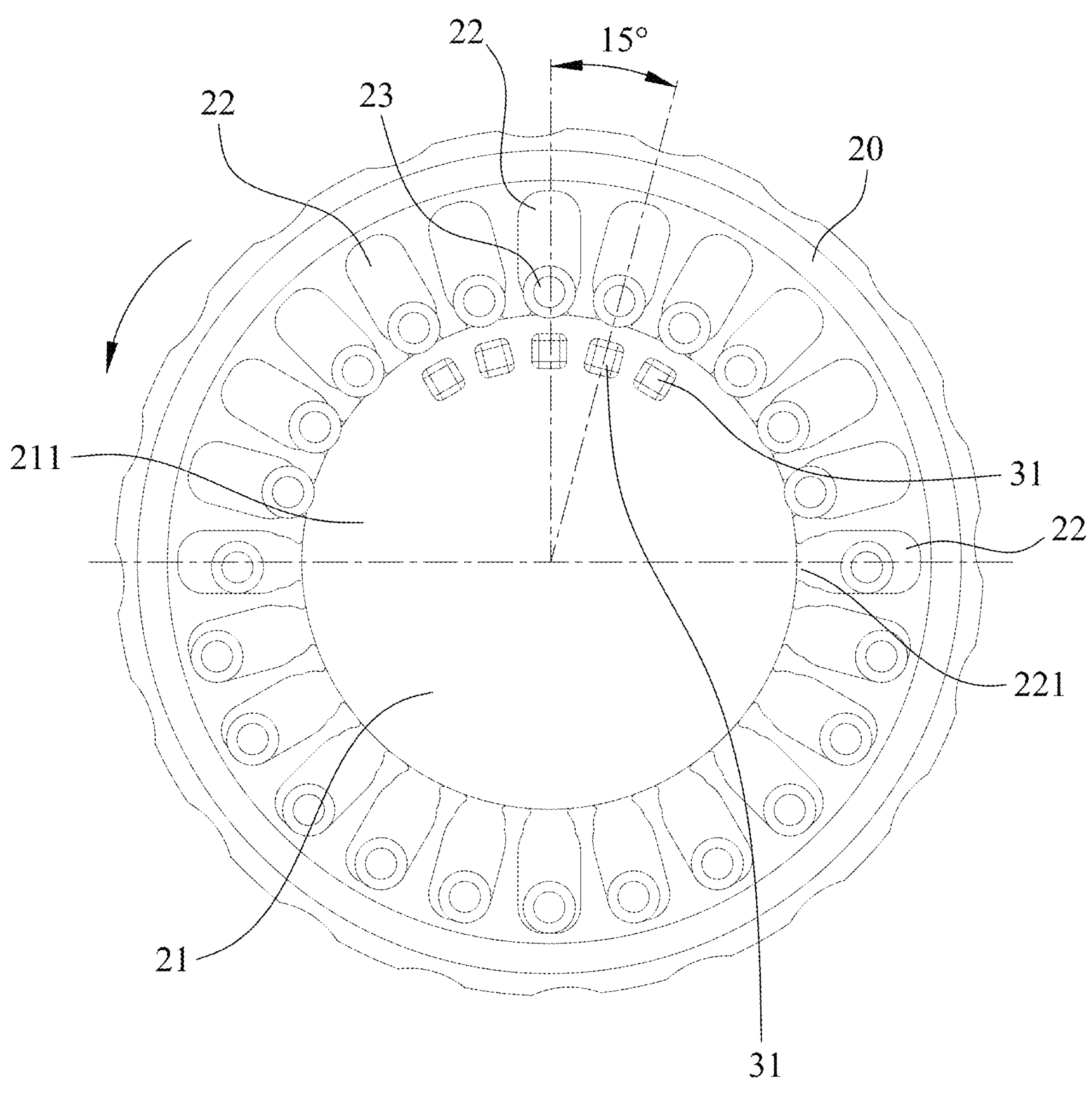
FIG. 7 is a schematic view of the structure of the present invention when operating in the toggle mode.
Figure 8:
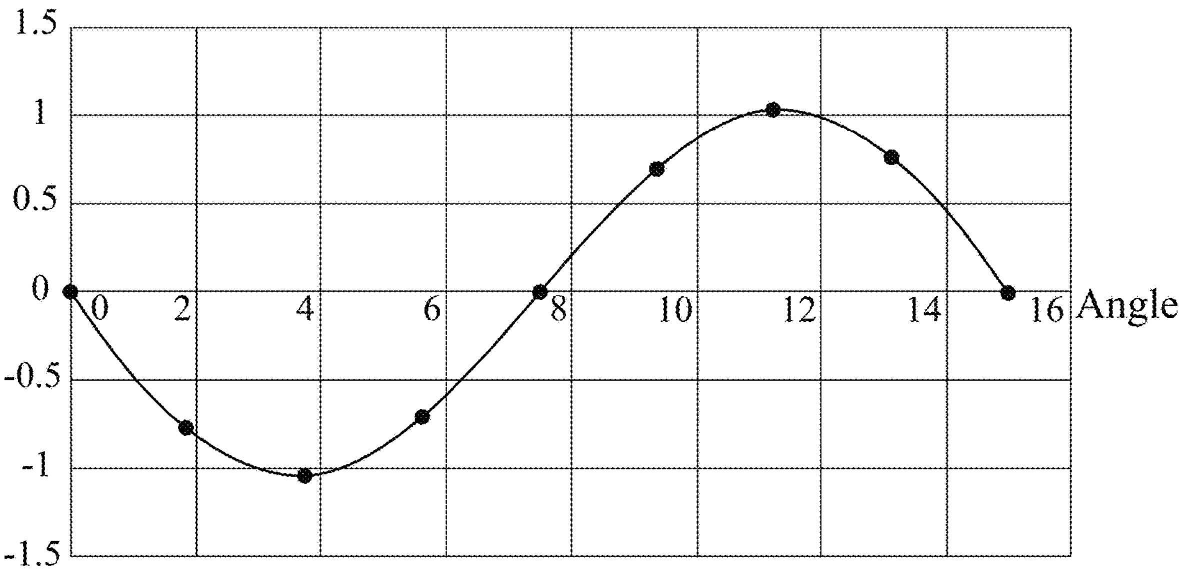
FIG. 8 is a diagram showing the torque change during the process of rotating the scroll wheel body of the present invention by 15 degrees.

Next, the actual operation of the present invention is described. For ease of illustration, FIGS. 7 and 9 primarily illustrate the relative positions of the magnetic conductive members 23 and the magnets 31 during operation:

FIG. 7 illustrates the state of the present invention in toggle mode. The magnet 31 can be disposed on the fixed base 30 at any angle. By the magnetic force, the magnetic conductive member 23 near the magnet 31 stops at the opening 221 of the guide groove 22. In the present embodiment, when the magnet 31 is disposed directly above the fixed base 30, the cylindrical magnetic conductive members 23 are ultimately arranged in a first distribution pattern within the scroll wheel body 20. In the first distribution state, the magnetic conductive members 23 are positioned near the opening 221 due to the magnetic force. At this point, the magnet 31 and the cylindrical magnetic conductive members 23 are very close together, exerting a strong magnetic force on each other. When the scroll wheel body 20 rotates, the magnetic conductive members 23 spaced apart and adjacent to the magnet 31 are affected by the magnet's force, generating a periodic magnetic restoring force (as shown in FIG. 8). This periodic magnetic restoring force creates a periodic resistive torque, resulting in a distinct, intermittent gear feel experienced by the operator when the scroll wheel body 20 is rotated.

Figure 9:
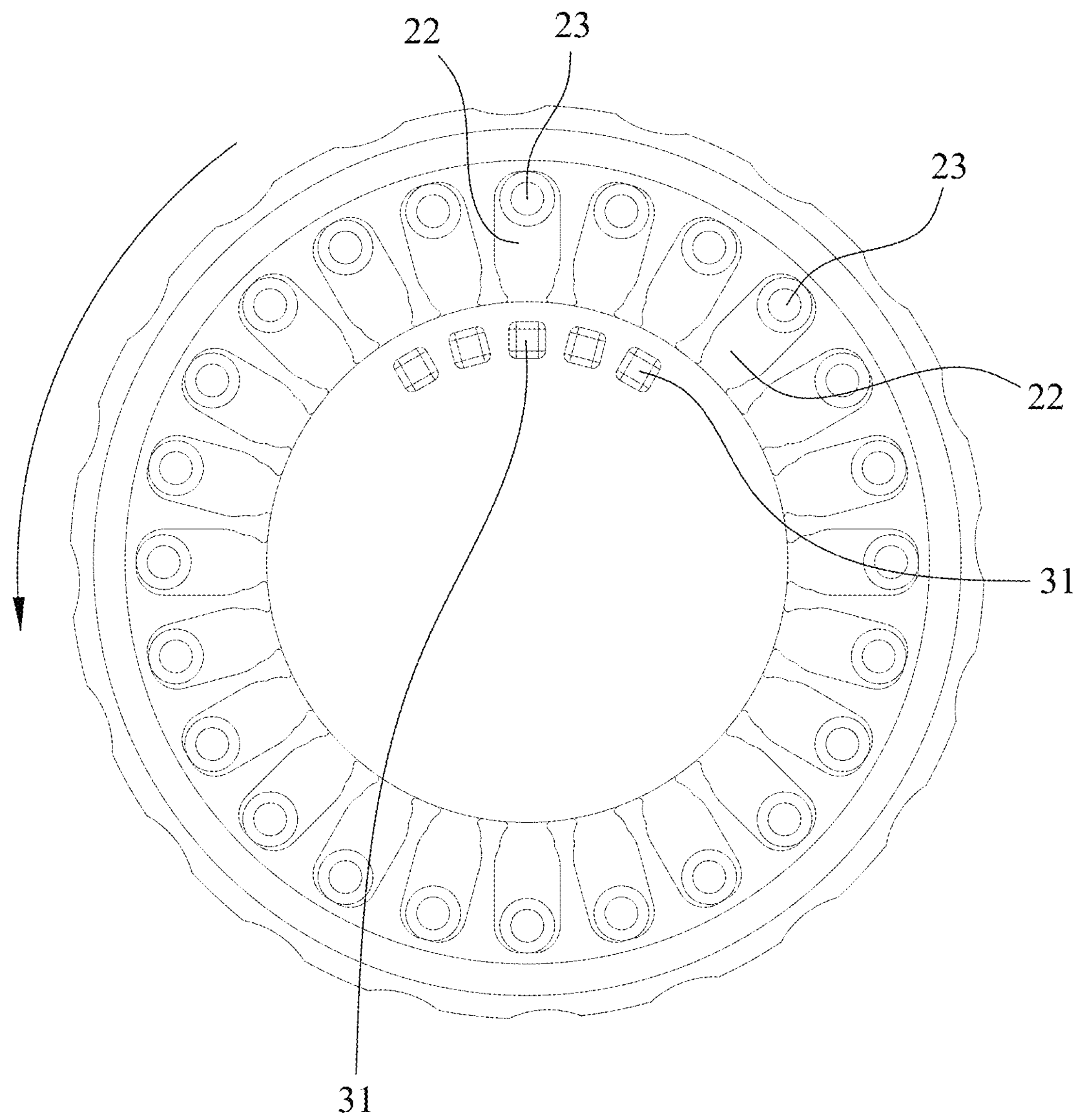
FIG. 9 is a schematic view of the structure of the present invention when operating in the flywheel mode.

FIG. 9 illustrates the operation of the present invention in the flywheel mode. When the scroll wheel body 20 rotates rapidly, the cylindrical magnetic conductive members 23 are primarily affected by centrifugal force. Since the magnetic conductive members 23 move freely radially within the guide grooves 22, as the speed increases, the magnetic conductive members 23 eventually form a second distribution within the scroll wheel body 20. In the second distribution, all cylindrical magnetic conductive members 23 on the scroll wheel body 20 are positioned at the outermost positions within the guide grooves 22, farthest from the center of the scroll wheel body 20, due to centrifugal force.

At this point, the magnet 31 and the magnetic conductive members 23 are far apart, and there is no magnetic interaction between the two. Without any resistive torque, the scroll wheel body 20 can rotate rapidly, achieving the flywheel mode. The critical speed at which the magnetic conductive members 23 form the second distribution can be calculated by the following formula. Therefore, the operator can enter the flywheel mode by simply increasing the scroll wheel body 20 speed over the critical speed.

Figure 10:
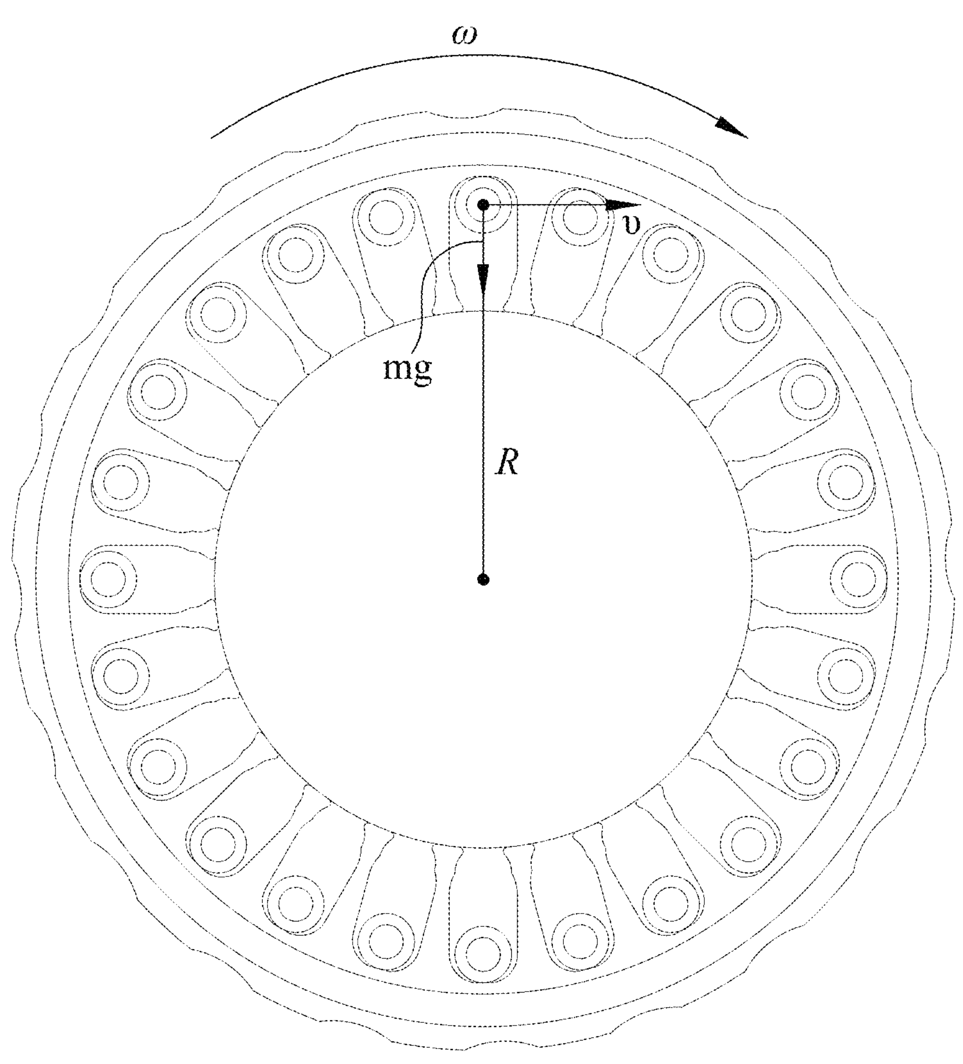
FIG. 10 is a schematic diagram of the angular velocity and linear velocity of the components in the flywheel mode of the present invention.

Refer to FIG. 10 and the following formula:

$$v = R\omega$$

$$v_c = R\omega_c$$

$$\text{mg} = m\frac{v_c^2}{R} = mR\omega_c^2$$

$$\omega_c = 2\pi f_c = \sqrt{\frac{g}{R}}$$

$$f_c(rps) = \frac{1}{2\pi}\sqrt{\frac{g}{R}}$$

Wherein, ν: linear velocity. R: distance from the center of the scroll wheel body to the center of the magnetic conductive member. ω: angular velocity. $\nu_c$: critical linear velocity. $\omega_c$: critical angular velocity. m: weight of the magnetic conductive member. g: gravity. $f_c$: critical rotational speed.

In summary, the mouse scroll wheel mechanism of the present invention utilizes the rotational speed of the scroll wheel body 20 to switch between operating modes. The scroll wheel body can correspond to the mouse wheel's toggle mode and flywheel mode at different rotational speeds. Specifically, when the rotational speed is slow, the distance between the magnet 31 and a portion of the magnetic conductive member 23 is shortest, and the mutual magnetic force is strongest at this point, allowing the operator to feel a clear gear feel when turning the scroll wheel body 20. When the rotational speed exceeds the critical speed, the distance between the magnetic conductive member 23 and the magnet 31 is very large after centrifugal force movement, and there is no magnetic force between the two. The scroll wheel body 20 can rotate rapidly to achieve the flywheel mode. The switching process is smooth, without the brief pause that is inevitably produced when switching using a conventional electronic control mechanism. The present invention allows users to operate the mouse more conveniently and quickly. Moreover, because the present invention does not require an additional electronic control circuit and linkage mechanism, the overall manufacturing cost can be further reduced, making the product more competitive in the market.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mouse scroll wheel mechanism, comprising:

a scroll wheel base;

a scroll wheel body, mounted on the scroll wheel base and rotating vertically in an upright position, shaped partially annular and having a central accommodation space, the scroll wheel body being disposed with a plurality of radially distributed guide grooves, with each guide groove provided with at least one magnetic conductive member partially protruding through an opening of the guide groove without leaving the guide groove while the at least one magnetic conductive member is located and moves within the guide groove in a direction toward or away from the center of the scroll wheel body; and a fixed base, fixed to the scroll wheel base and located within the central accommodation space, the fixed base being provided with at least one magnet, and the at least one magnet being disposed in a non-contacting manner facing the guide grooves;

wherein each of the guide grooves has a guide groove radial width and a guide groove axial width, each of the at least one magnetic conductive member has a magnetic conductive member diameter and a magnetic conductive member axial width, the opening has an opening radial width, the guide groove axial width is greater than the magnetic conductive member axial width, the magnetic conductive member diameter is smaller than the guide groove radial width and greater than the opening radial width, and when the scroll wheel body rotates, variations in a rotational speed cause variations in magnetic force between the at least one magnet and the at least one magnetic conductive member to produce an intermittent gear feel or a rapidly rotating flywheel feel.

2. The mouse scroll wheel mechanism according to claim 1, wherein a plurality of the guide grooves are arranged at equal intervals on the scroll wheel body, and the guide grooves are distributed radially along the scroll wheel body.

3. The mouse scroll wheel mechanism according to claim 1, wherein the at least one magnetic conductive member is made of a metal or magnetic conductive material that can be attracted by a magnet and shaped as cylindrical, strip-shaped, spherical, or tubular.

4. The mouse scroll wheel mechanism according to claim 1, wherein the fixed base fixes a plurality of magnets at intervals and faces the guide grooves, and a spacing between each of the plurality of magnets and an edge of a corresponding guide groove is the same.

5. The mouse scroll wheel mechanism according to claim 4, wherein the fixed base is arc-shaped and fixes the plurality of magnets.

6. The mouse scroll wheel mechanism according to claim 1, wherein a first angle is formed between two adjacent guide grooves, and the fixed base fixes a plurality of magnets at equal intervals and faces the guide grooves, and two adjacent magnets form a second angle, and the first angle is equal to the second angle.

7. The mouse scroll wheel mechanism according to claim 1, wherein when the at least one magnetic conductive member moves within the guide groove to a position closest to the center of the scroll wheel body, the at least one magnet is closest to the at least one magnetic conductive member and generates a strongest magnetic force; and when an operator moves the scroll wheel body, an intermittent strong and weak magnetic force makes the operator feel a gear feel.

8. The mouse scroll wheel mechanism according to claim 1, wherein when the at least one magnetic member moves within the guide groove to a position furthest from the center of the scroll wheel body, there is no magnetic interaction between the at least one magnet and the at least one magnetic conductive member, and a user experiences a flywheel feel when the scroll wheel body rotates rapidly.

* * * * *